United States Patent
Hu et al.

(10) Patent No.: US 8,533,498 B2
(45) Date of Patent: Sep. 10, 2013

(54) POWER CONTROL SYSTEM OF A BASEBOARD MANAGEMENT CONTROLLER AND METHOD THEREOF

(75) Inventors: Ming-Xiang Hu, Shenzhen (CN); Jun-Min Chen, Shenzhen (CN); Chao-Dong Peng, Shenzhen (CN); Le Lin, Shenzhen (CN); Zhi-Jian Long, Shenzhen (CN); Xiao-Fei Chen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 292 days.

(21) Appl. No.: 13/043,474

(22) Filed: Mar. 9, 2011

(65) Prior Publication Data

US 2011/0271123 A1 Nov. 3, 2011

(30) Foreign Application Priority Data

Apr. 28, 2010 (CN) .......................... 2010 1 0158505

(51) Int. Cl.
*G06F 1/26* (2006.01)
(52) U.S. Cl.
USPC ........................................... 713/300; 713/310
(58) Field of Classification Search
None
See application file for complete search history.

(56) References Cited

U.S. PATENT DOCUMENTS 7,774,633 B1 * 8/2010 Harrenstien et al. .......... 713/323
2011/0087910 A1 * 4/2011 Lambert et al. ............... 713/323

* cited by examiner

*Primary Examiner* — Paul Yanchus, III
*(74) Attorney, Agent, or Firm* — Altis Law Group, Inc.

(57) ABSTRACT

A method controls power of a baseboard management controller (BMC). A power control signal of the BMC is generated for powering up or powering down the BMC. An enabling signal is generated according to the power control signal. A power supply device is directed to output one or more voltages to the BMC.

8 Claims, 4 Drawing Sheets

POWER CONTROL SYSTEM OF A BASEBOARD MANAGEMENT CONTROLLER AND METHOD THEREOF

BACKGROUND

1. Technical Field

Embodiments of the present disclosure relate to power control, and particularly to a baseboard management controller power control system and method.

2. Description of Related Art

A baseboard management controller (BMC) is a specialized microcontroller embedded in a computer, such as a server, for example. The computer may include a power supply device providing power to the BMC and a motherboard of the computer. The power provided to the BMC, however, cannot be controlled independently. Powering down the BMC can generate undesired power disruption of the motherboard, which may result in data loss.

DETAILED DESCRIPTION

In general, the word "module," as used hereinafter, refers to logic embodied in hardware or firmware, or to a collection of software instructions, written in a programming language, such as, for example, Java, C, or Assembly. One or more software instructions in the modules may be embedded in firmware. It will be appreciated that modules may comprised connected logic modules, such as gates and flip-flops, and may comprise programmable modules, such as programmable gate arrays or processors. The modules described herein may be implemented as either software and/or hardware modules and may be stored in any type of computer-readable medium or other computer storage device.

Figure 1:
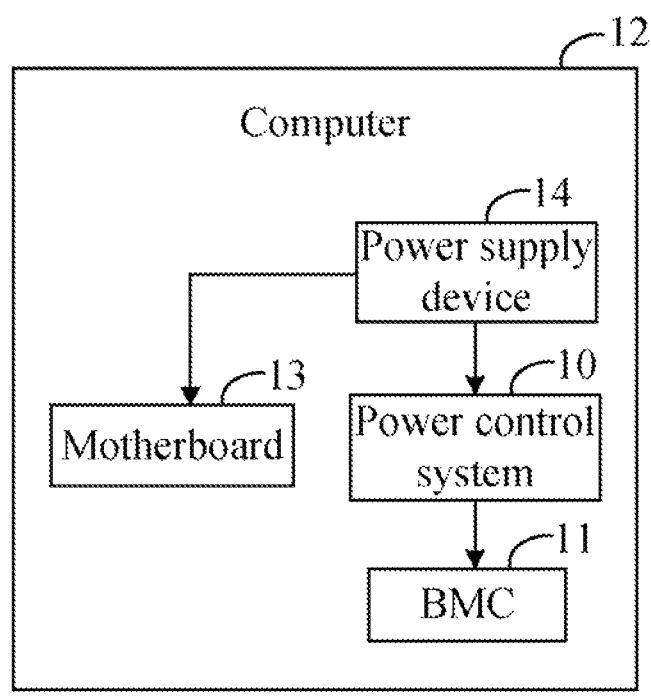
FIG. 1 is a block diagram of an application environment of one embodiment of a power control system of a baseboard management controller (BMC).

FIG. 1 is a block diagram of one embodiment of an application environment of a power control system 10 of a baseboard management controller (BMC) 11. In one embodiment, the power control system 10 and the BMC 11 may be embedded in a computer 12, such as a server, for example. The computer 12 further includes a motherboard 13 and a power supply device 14. The power supply device 14 is connected to the motherboard 13 and the power control system 10. The power control system 10 is further connected to the BMC 11. The power supply device 14 provides power to the motherboard 13 and the BMC 11. The power control system 10 may be used to control the power of the BMC 11 independently, without disrupting power to the motherboard 13.

Figure 2:
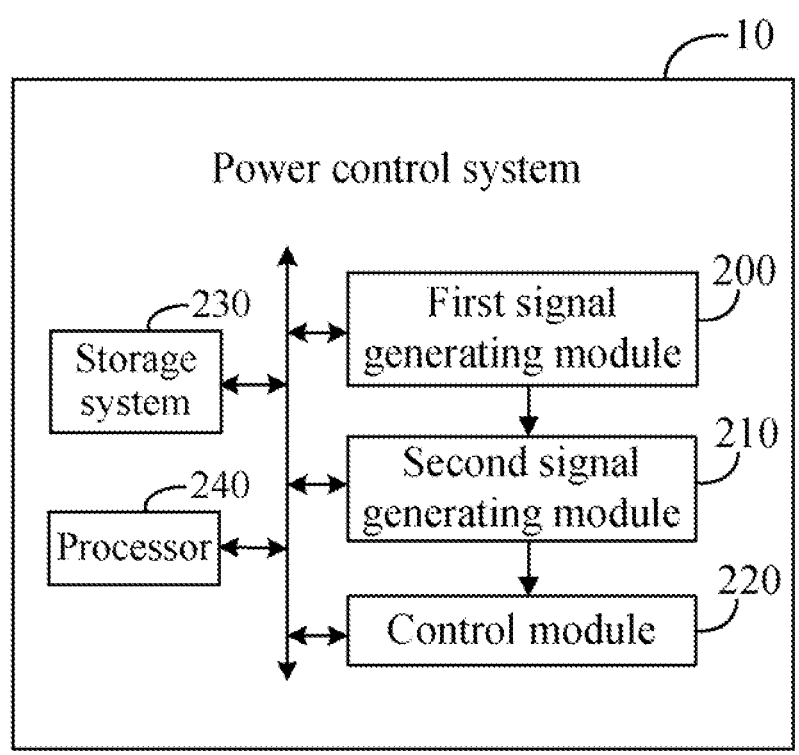
FIG. 2 is a block diagram of the power control system of FIG. 1.

FIG. 2 is a block diagram of the power control system 10 of FIG. 1. In one embodiment, the power control system 10 may include a first signal generating module 200, a second signal generating module 210, a control module 220, a storage system 230, and at least one processor 240. The function modules 200-220 may comprise computerized codes in the form of one or more programs stored in the storage system 230. The computerized codes includes instructions executed by the at least one processor 240 to provide functions for the modules. In one embodiment, the storage system 230 may be an internal storage device, such as a random access memory (RAM) for temporary storage of information, and/or a read only memory (ROM) for permanent storage of information. In some embodiments, the storage system 230 may also be an external storage device, such as an external hard disk, a storage card, or a data storage medium.

The first signal generating module 200 generates a power control signal of the BMC 11 according to user requirements. The power control signal may be used for powering up or powering down the BMC 11. Hereinafter, the power control signal used for powering up the power of the BMC 11 is referred to as "the power-up signal," and the power control signal used for powering down the BMC 11 is referred to as "the power-down signal." In one embodiment, the first signal generating module 200 generates the power control signal according to a status of an electrical switch of the first signal generating module 200. In one example, if the electrical switch is closed, the first signal generating module 200 generates the power-up signal. If the electrical switch is open, the first signal generating module 200 generates the power-down signal. Depending on embodiments, the first signal generating module 200 may generate the power control signal according to a power control parameter specified by a user. For example, if the power control parameter is set as a digit "1," the first signal generating module 200 generates the power-up signal. If the power control parameter is set as a digit "0," the first signal generating module 200 generates the power-down signal.

The second signal generating module 210 receives the power control signal from the first signal generating module 200, and generates an enabling signal according to the power control signal. The enabling signal determines whether to enable the control module 220. In one embodiment, a high level enabling signal, such as a 5V signal, is generated when the second signal generating module 210 receives the power-up signal, which enables the control module 220. A low level enabling signal, such as a 0V signal, is generated when the second signal generating module 210 receives the power-down signal, which disables the control module 220.

Figure 3:
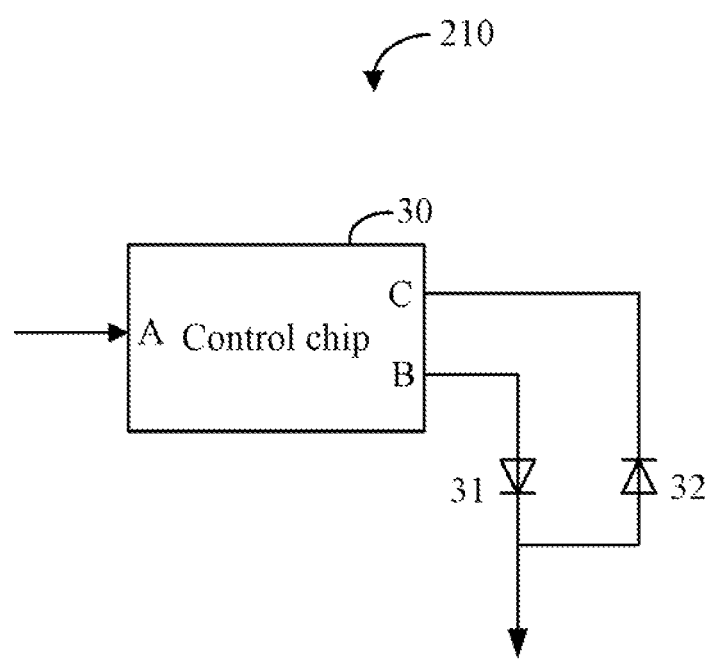
FIG. 3 illustrates a second signal generating module of the power control system of FIG. 2.

FIG. 3 illustrates a second signal generating module of the power control system of FIG. 2. The second signal generating module 210 may include a control chip 30 and two diodes 31-32, such as semiconductor diodes. The control chip 30 includes an input terminal "A" and two output terminals "B" and "C." Each of the diodes 31-32 includes an anode and a cathode. The output terminal "B" is connected to the anode of the diode 31. The output terminal "C" is connected to the cathode of the diode 32. Furthermore, the cathode of the diode 31 is connected to the anode of the diode 32. The input terminal "A" receives the power control signal from the first signal generating module 200. The cathode of the diode 31 and the anode of the diode 32 output the enabling signal to the control module 220.

In one embodiment, when receiving the power-up signal, the control chip 30 may output a high level voltage, such as 5V voltage, at the output terminals "B" and "C." Thus, the diode 31 is forward-biased, such that current is permitted from anode to cathode of the diode 31 and the enabling signal is high level. When receiving the power-down signal, the control chip 30 may output a low level voltage, such as 0V voltage, at the output terminals "B" and "C." Thus, the diode 32 is forward-biased, such that current is permitted from anode to cathode of the diode 32 and the enabling signal is low level. The output terminals "B" and "C" may be in a highimpedance state if the control chip 30 does not receive the power control signal from the first signal generating module 200.

The control module 220 receives the enabling signal from the second signal generating module 210, and directs the power supply device 14 to output one or more voltages to the BMC 11 according to the enabling signal. In one embodiment, if receiving the high level enabling signal, the control module 220 directs the power supply device 14 to output the voltages to the BMC 11. If the low level enabling signal is received, the control module 220 directs the power supply device 14 to output no voltages to the BMC 11. In one embodiment, the control module 220 receives one or more initial voltages of the BMC 11 from the power device 14. The control module 220 converts the initial voltages into one or more working voltages of the BMC 11 according to the enabling signal. In one example, the power device 14 provides a 5V initial voltage of the BMC 11. The control module 220 converts 5V initial voltage into a 1.2V working voltage and a 1.8V working voltage of the BMC 11.

Figure 4:
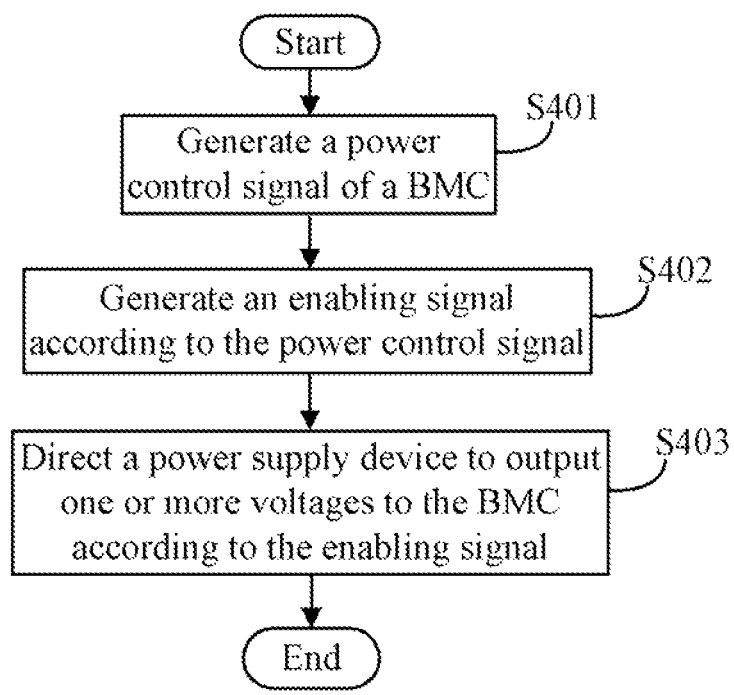
FIG. 4 is a flowchart of one embodiment of a power control method for a BMC such as, for example, that of FIG. 1.

FIG. 4 is a flowchart of one embodiment of a power control method for a BMC such as, for example, that of FIG. 1. The method may control power of the BMC 11 independently. Depending on the embodiments, additional blocks may be added, others removed, and the ordering of the blocks may be changed.

In block S401, the first signal generating module 200 generates a power control signal of the BMC 11 according to user requirements. The power control signal may be a power-up signal for powering up the power of the BMC 11 or a power-down signal for powering down the BMC 11. Depending on embodiments, the first signal generating module 200 may generate the power control signal according to a status of an electrical switch of the first signal generating module 200, or a power control parameter specified by a user.

In block S402, the second signal generating module 210 receives the power control signal from the first signal generating module 200, and generates an enabling signal accordingly. As mentioned, the enabling signal determines whether the control module 220 is disabled. In one embodiment, the enabling signal may be low level or high level.

In block S403, the control module 220 receives the enabling signal from the second signal generating module 210, and directs the power supply device 14 to output voltages to the BMC 11 according to the enabling signal. In one embodiment, the power device 14 outputs one or more initial voltages of the BMC 11 to the control module 220. The control module 220 converts the initial voltages into one or more working voltages of the BMC 11 according to the enabling signal.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A power control system of a baseboard management controller (BMC), the system connected to a power supply device and the BMC, the system comprising:
    a control chip comprising an input terminal, a first output terminal, and a second output terminal;
    a first diode comprising a first anode and a first cathode, wherein the first anode is connected to the first output terminal;
    a second diode comprising a second anode and a second cathode, wherein the second cathode is connected to the second output terminal and the second anode is connected to the first cathode;
    at least one processor; and
    a storage system storing a plurality of instructions, which when executed by the at least one processor, cause the at least one processor to:
    generate a power control signal for the BMC for powering up or powering down the BMC, wherein the power control signal is inputted to the input terminal of the control chip, the control chip outputs a voltage at the first output terminal and the second output terminal according to the power control signal, and the power control signal is generated according to a status of a switch or a power control parameter specified by a user; and
    direct the power supply device to output one or more voltages to the BMC according to an enabling signal outputted from the first cathode and the second anode.

2. The system of claim 1, wherein the power supply device provides one or more initial voltages to the BMC, and the initial voltages are converted into one or more working voltages of the BMC according to the enabling signal.

3. The system of claim 1, wherein the enabling signal is a high level signal if the power control signal is used to turn on the power of the BMC.

4. The system of claim 1, wherein the enabling signal is a low level signal if the power control signal is used to turn off the power of the BMC.

5. A power control method for a baseboard management controller (BMC), the method comprising:
    generating a power control signal for the BMC for powering up or powering down the BMC, wherein the power control signal is generated according to a status of a switch or a power control parameter specified by a user;
    generating an enabling signal according to the power control signal using a control chip, a first diode, and a second diode, wherein the control chip comprises an input terminal, a first output terminal, and a second output terminal, the first diode comprises a first anode and a first cathode, the second diode comprises a second anode and a second cathode, the first output terminal is connected to the first anode, the second output terminal is connected to the second cathode, the first cathode is connected to the second anode, the input terminal receives the power control signal, the first cathode and the second anode output the enabling signal, and the control chip outputs a voltage at the first output terminal and the second output terminal according to the power control signal; and
    directing a power supply device to output one or more voltages to the BMC according to the enabling signal.

6. The method of claim 5, wherein the power supply device provides one or more initial voltages of the BMC, and the initial voltages are converted into one or more working voltages of the BMC according to the enabling signal.

7. The method of claim 5, wherein the enabling signal is a high level signal if the power control signal is used to turn on the power of the BMC.

8. The method of claim 5, wherein the enabling signal is a high level signal if the power control signal is used to turn off the power of the BMC.

* * * * *